United States Patent [19]

Leigh-Monstevens

[11] Patent Number: 4,684,003
[45] Date of Patent: Aug. 4, 1987

[54] CONCENTRIC SLAVE CYLINDER FOR MOTOR VEHICLE CLUTCH CONTROL MECHANISM

[75] Inventor: Keith V. Leigh-Monstevens, Troy, Mich.

[73] Assignee: Automotive Products plc, Warwickshire, England

[21] Appl. No.: 537,869

[22] Filed: Sep. 30, 1983

[51] Int. Cl.⁴ .............................................. F16D 19/00
[52] U.S. Cl. .............................. 192/85 CA; 192/91 A
[58] Field of Search ............ 192/85 CA, 91 A, 85 R, 192/98, 110 B, 105 F

[56] References Cited

U.S. PATENT DOCUMENTS

| | | | |
|---|---|---|---|
| 2,422,155 | 6/1947 | Wemp | 192/105 F |
| 2,564,281 | 8/1951 | Rockwell | 192/91 A |
| 2,864,480 | 12/1958 | Sink | 192/91 A |
| 2,890,687 | 6/1959 | Richmond | 192/85 CA |
| 2,967,396 | 1/1961 | Staadt | 192/111 A |
| 3,004,438 | 10/1961 | Funk et al. | 192/85 CA |
| 3,687,253 | 8/1972 | Bjorklund | 192/91 A |
| 3,907,085 | 9/1975 | Rist | 192/91 A |
| 3,955,660 | 5/1976 | Poon et al. | 192/91 A |
| 4,399,898 | 8/1983 | Olschewski et al. | 192/98 |
| 4,454,632 | 6/1984 | Nix et al. | 24/16 PB |

FOREIGN PATENT DOCUMENTS

| | | | |
|---|---|---|---|
| 669182 | 8/1963 | Canada | 192/91 A |
| 904380 | 7/1949 | Fed. Rep. of Germany | 192/91 A |
| 3021386 | 12/1981 | Fed. Rep. of Germany | 192/85 CA |
| 1027925 | 4/1966 | United Kingdom . | |
| 1322315 | 7/1973 | United Kingdom | 192/91 A |

Primary Examiner—Craig R. Feinberg
Assistant Examiner—David A. Okonsky
Attorney, Agent, or Firm—Krass & Young

[57] ABSTRACT

A slave cylinder disposed concentric to a shaft connecting a motor vehicle friction clutch to the input of the motor vehicle gearbox. The slave cylinder is annular and is formed by a pair of tubular members spaced apart and disposed concentric to each other, the innermost tubular member being disposed concentric to the shaft. The slave cylinder is cast integral as a single piece with the clutch bell housing or as a single piece with the gearbox housing end plate through which the shaft projects. Alternatively, one of the cylinder wall tubular members is cast integral with the bell housing or the gearbox housing end plate, and the other tubular member in the form of a separate casting or molding bolted thereon.

1 Claim, 7 Drawing Figures

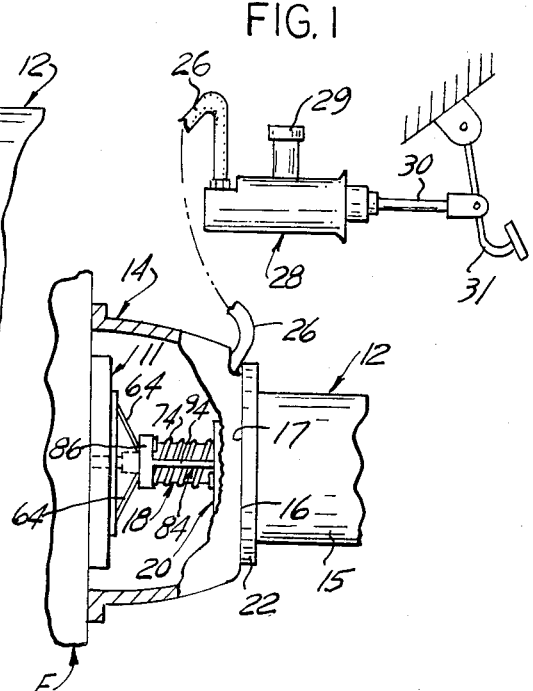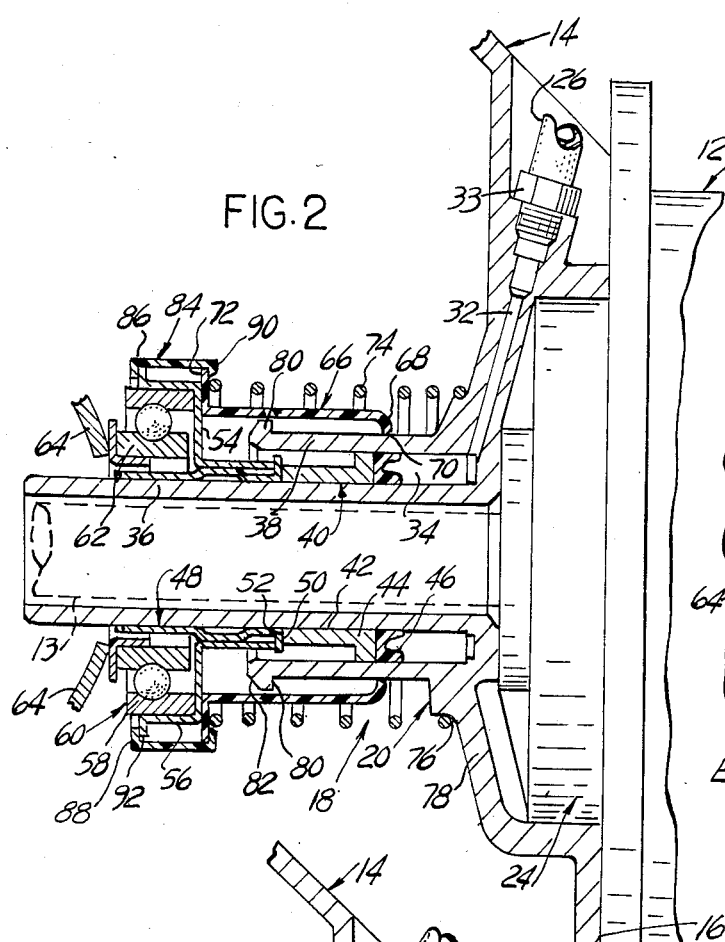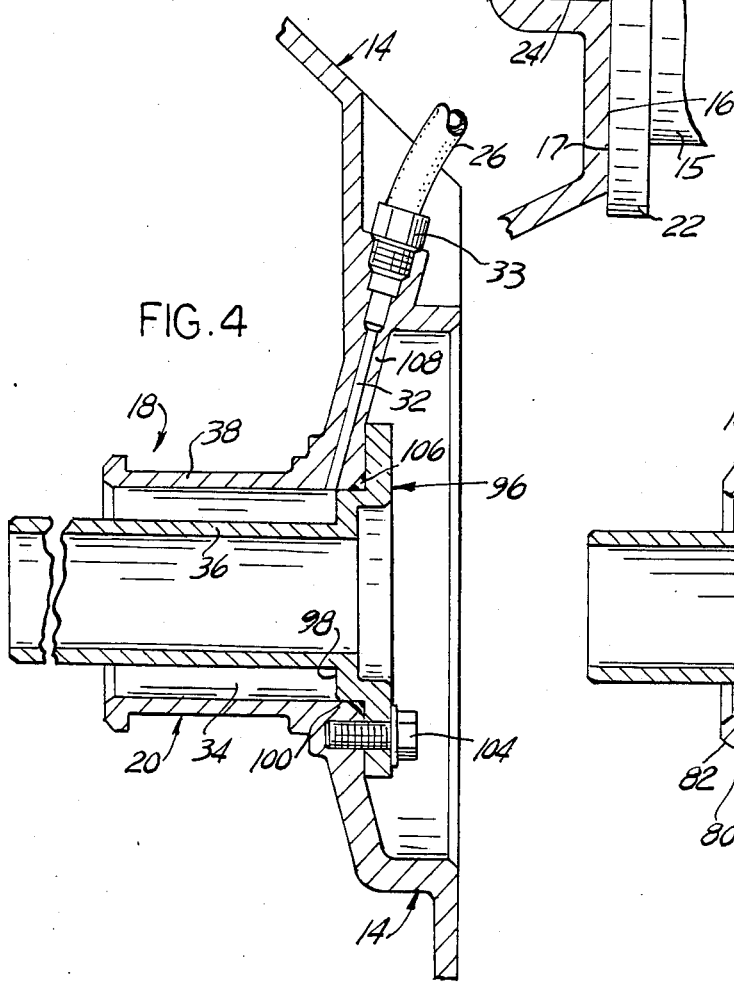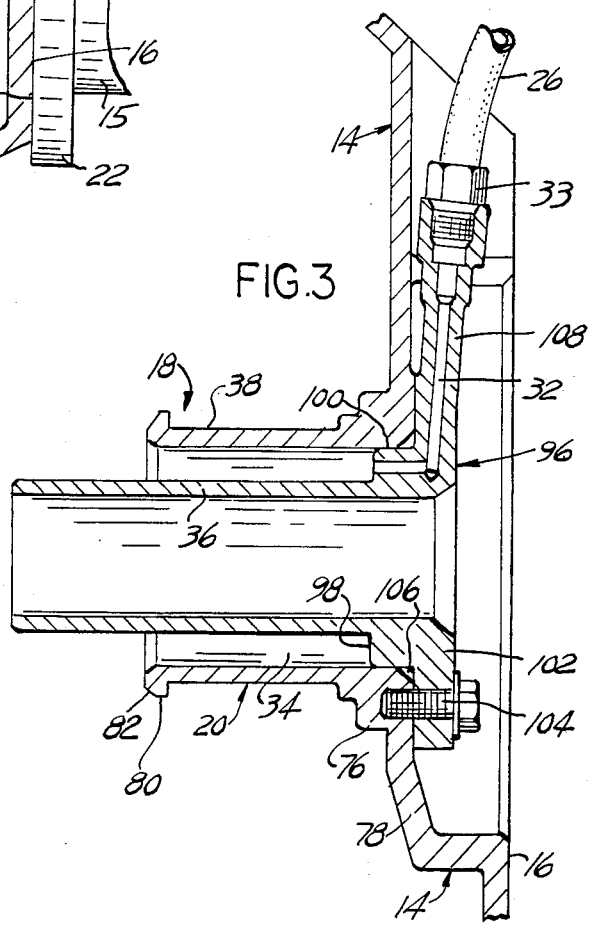

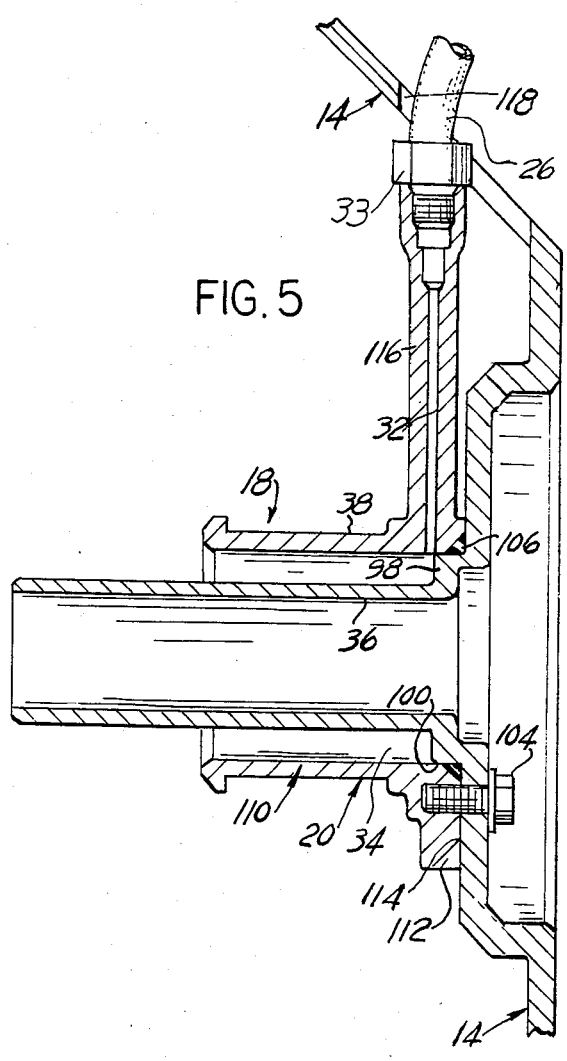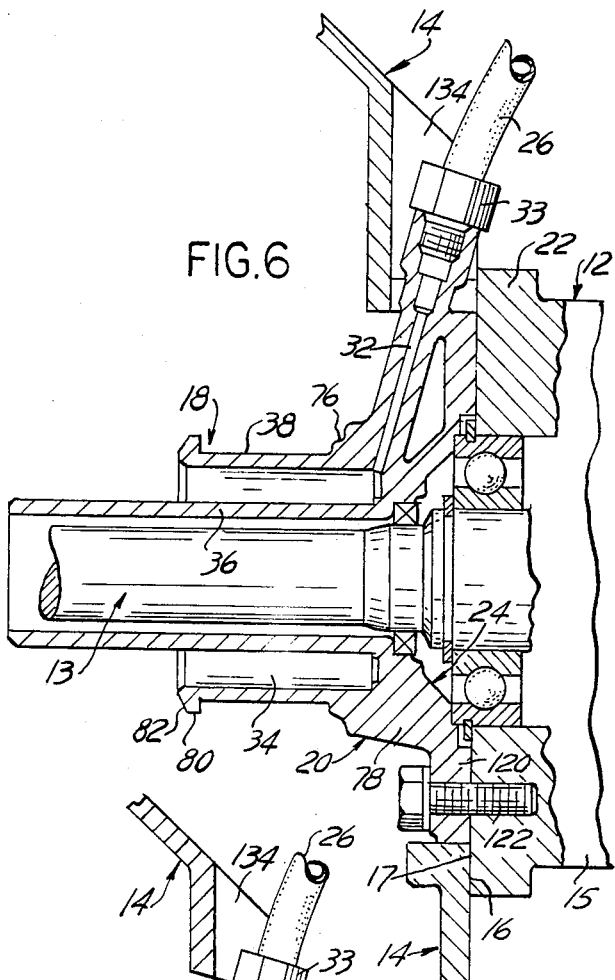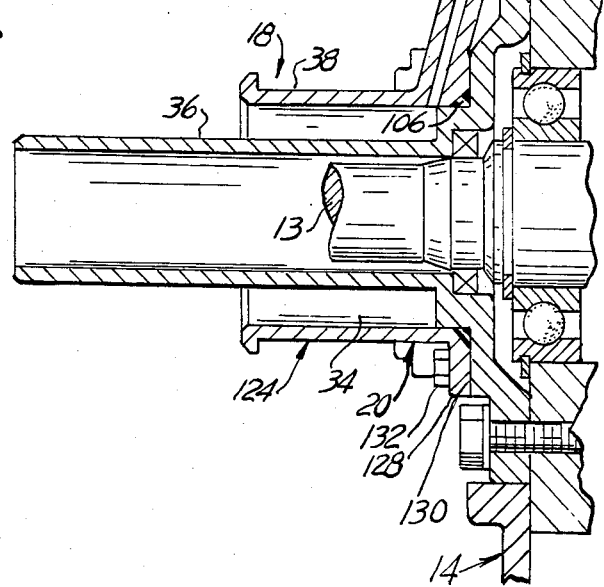

4,684,003

CONCENTRIC SLAVE CYLINDER FOR MOTOR VEHICLE CLUTCH CONTROL MECHANISM

BACKGROUND OF THE INVENTION

The present invention relates to motor vehicle clutch control mechanisms in general, and more particularly the present invention relates to a friction clutch hydraulic control mechanism having a slave cylinder disposed concentric to the drive shaft coupling the driven member of the friction clutch to the transmission input shaft.

Concentric hydraulic slave cylinders for operating the throw-out bearing of mechanical diaphragm spring and coil spring clutches are well known. Such concentric slave cylinders are generally bolted to the face of the transmission or gearbox casing or, in the alternative and as disclosed in copending applications Ser. Nos. 400,276 now abandoned, 477,159 now U.S. Pat. No. 4,585,106, 477,160 now U.S. Pat. No. 4,585,107, 477,161 now U.S. Pat. No. 4,585,108 and 477,162 now U.S. Pat. No. 4,585,109, all assigned to the same assignee as the present application the slave cylinder housing is provided with an upwardly extending radial member or lug, provided with a passageway for supplying fluid to the slave cylinder, which is disposed in a groove or channel formed in the clutch bell housing and clamped between the bell housing end face and the face of the gearbox casing.

SUMMARY OF THE INVENTION

The present invention provides a hydraulic slave cylinder for the operation of a mechanical clutch throw-out bearing, disposed concentric to the driveshaft coupling the driven member of the friction clutch to the transmission input, which is formed integral with the clutch bell housing or, in the alternative, which is formed integral with the transmission or gearbox casing face, such that the slave cylinder is already preassembled to the clutch bell housing when the bell housing is bolted to the transmission or gearbox casing during assembly of a motor vehicle or, in its alternate configuration, the slave cylinder is already preassembled to the transmission or gearbox casing.

In addition to permitting the slave cylinder to be part of the clutch bell housing assembly or, alternatively, to be part of the transmission or gearbox assembly, the present invention is adapted to be manufactured and assembled in the form of a complete system comprising the slave cylinder and clutch bell housing subassembly or, in the alternative, the slave cylinder and gearbox preassembly, the master cylinder provided with a built-in hydraulic fluid reservoir or a separate hydraulic fluid reservoir, and a flexible line interconnecting the master cylinder to the slave cylinder. The hydraulic apparatus comprising the slave cylinder, the master cylinder, the interconnecting line and the hydraulic fluid reservoir is preferably prefilled with hydraulic fluid and tested prior to shipment to a motor vehicle manufacturer for installation on a motor vehicle.

These and other objects of the present invention will become apparent to those skilled in the art when the following description of the best modes contemplated for practicing the invention is read in conjunction with the accompanying drawing wherein like numerals refer to like or equivalent parts and in which:

BRIEF DESCRIPTION OF THE DRAWING

FIG. 1 is a schematic representation of a clutch hydraulic control apparatus according to the present invention;

FIG. 2 is a partial longitudinal section thereof, at an enlarged scale;

FIGS. 3-5 are views similar to FIG. 2, omitting the elements of FIG. 2 not necessary for a proper understanding of the invention and illustrating modifications of the structure of FIG. 2; and FIGS. 6-7 are views similar to FIGS. 3-5 but showing further modifications of the invention.

DETAILED DESCRIPTION OF THE PREFERRED EMBODIMENTS

Referring to the drawing, and more particularly to FIG. 1, a motor vehicle transmission is schematically illustrated as comprising a friction clutch assembly 11 and a gearbox or transmission 12 enclosed in a casing or housing 15. A driveshaft 13 drives the gearbox 12 from the clutch assembly 11. A bell housing 14, surrounding the clutch assembly 11, is bolted on the rear face of the motor vehicle engine E. The rear face 16 of the bell housing 14 is bolted to the face 17 of the gearbox casing 15. An annular hydraulic slave cylinder 18 is disposed around the driveshaft 13 within the bell housing 14. The slave cylinder 18 has a one piece housing 20 cast integral with the clutch bell housing 14. The face 17 of the gearbox casing 20 is on a flange 22, and an end plate 24, FIG. 2, closing the end of the gearbox casing 15 is also bolted to the face 17 of the gearbox casing 15, the transmission input shaft 13, as shown in dashed lines at FIG. 1, projecting through the end plate 24.

The slave cylinder 18 is connected via a hydraulic fluid conduit 26 to a master cylinder 28, FIG. 1. The master cylinder is provided with a built-in hydraulic fluid reservoir 29, in the example of structure illustrated, and has an input rod 30 pivotally connected at an end to a clutch control pedal 31 installed within the driver compartment of a motor vehicle, not shown. The rod 30, as is well known, is connected to a piston, not shown, disposed in the master cylinder 28 for displacing the hydraulic fluid through the line 26 to the slave cylinder 18 when the clutch pedal 31 is depressed. The hydraulic fluid is introduced through a passageway 32, FIG. 2, to which is connected an end fitting 33 of the line 26, into an annular chamber 34 in the slave cylinder housing 20. The annular chamber 34 is formed between two concentric tubular portions 36 and 38 which are cast integral together with the bell housing 14.

An annular piston 40 is reciprocably and slidably disposed in the annular chamber 34 of the cylinder housing 20 between the two concentric tubular portions 36 and 38, the piston 40 having a relatively thin cylindrical portion slidably fitting about the periphery of the inner tubular portion 36, as shown at 42, and an integrally formed larger diameter annular head portion 44 slidably fitting between the concentric tubular portion 36 and 38. An elastomeric annular seal 46, V-shaped in section, is freely disposed in the annular chamber 34 above the annular head 44 of the piston 40, such as to prevent leakage of fluid from the annular chamber 34 past the piston 40.

A metallic sleeve, or carrier, 48 is slidably disposed around the periphery of the inner tubular portion 36 of the cylinder housing 20. The carrier 48 has a flanged end portion 50 freely engaged with the end face 52 of the cylindrical portion 42 of the piston 40, and another flange portion 54 disposed at its other end having a bent-over rim 56 fixedly supporting the outer race 58 of a ball bearing 60 forming the clutch throw-out bearing, the bearing outer race 58 being for example press-fitted within the carrier rim 56. The inner race 62 of the throw-out bearing 60 is arranged to engage the end of the clutch release fingers 64 such that when the throw-out bearing 60 is displaced outwardly from the position indicated in full line at FIG. 2, the clutch 11, FIG. 1, is released.

A dust cover 66 is disposed surrounding a portion of the carrier 48 and a portion of the peripheral surface of the outer tubular portion 38 of the cylinder housing 20. The dust cover 66 is generally cylindrical in shape and is molded of plastic such as nylon. One end of the dust cover 66 is formed with an inwardly radially projecting flange or lip 68 having an inner edge 70 in sliding engagement with the peripheral surface of the cylinder outer tubular portion 38. The other end of the dust cover 66 has an outwardly projecting flange portion 72 abutting against the flange portion 54 of the carrier 48. A coil spring 74 is held in compression between the flange portion 54 of the carrier 48 and an annular abutment 76 formed on a radially outwardly extending flange portion 78 of the cylinder housing 20, and thus tends to urge the flange 72 of the dust cover 66 engaged with the flange portion 54 of the carrier 48 with the result that when the throw-out bearing 60 is reciprocated, as a result of reciprocation of the piston 40, the dust cover 66 reciprocates in unison with the throw-out bearing, the inner edge 70 of the dust cover lip 68 remaining in engagement with the peripheral surface of the outer tubular portion 38 of the slave cylinder housing 20.

The slave cylinder housing 20 has at least a pair of diametrically arranged outwardly projecting lugs 80 disposed at the end of the outer tubular portion 38 of the slave cylinder housing 20, each lug 80 having an inclined leading edge forming a ramp 82. During assembly of the slave cylinder 18, the lugs 80 are engaged below the dust cover 66 by snapping the edge 70 of the dust cover lip 68 over the outwardly projecting lugs 80, the lug ramp 82 facilitating the passage of the lip edge 70 over the lugs 80.

The dust cover 66, in addition to acting as a seal against introduction of dirt therebelow, acts as a retainer preventing travel of the carrier 48 and the throw-out bearing 60 after assembly of the slave cylinder 18 beyond the limits defined by the inner face of the dust cover lip 68 engaging the lugs 80, under the urging action of the compressed coil spring 74. The coil spring 74 is relatively weak and, functionally, operates only to urge the throw-out bearing 60 constantly in engagement with the end of the fingers 64 of the clutch release mechanism, after installation of the assembly consisting of the clutch bell housing 14 and the integral slave cylinder 18 in a motor vehicle transmission train.

A restraining strap, designated generally at 84, is provided for retracting the throw-out bearing 60 to the position shown at FIGS. 1 and 2, after assembly of the slave cylinder 18, against the action of the compressed coil spring 74. The restraining strap 84 holds the throw-out bearing 60 in a retracted position during filling of the hydraulic system with hydraulic fluid, during shipment to a motor vehicle manufacturer and during assembly of the hydraulic clutch release system of the invention on a motor vehicle on the assembly line. Prefilling of the apparatus may be effected by filling the reservoir 29, FIG. 1, the master cylinder 28, the line 26 and the slave cylinder 18 with hydraulic fluid at a pressure slightly over atmospheric pressure, after opening a bleed nipple, not shown, until all atmospheric air is evacuated from the apparatus, in the same manner as disclosed in detail in co-pending application Ser. Nos. 911,477, 371,958 and 376,248. Alternatively, atmospheric air may be evacuated from the whole apparatus and the apparatus subsequently filled with fluid, as is explained in detail in co-pending application Ser. No. 400,276. In addition to providing a sub-assembly of a clutch release hydraulic unit, including a slave cylinder built in the clutch bell housing which is ready to be assembled on a motor vehicle on the assembly line, prefilling of the hydraulic apparatus permits to test the apparatus after assembly for leakage and proper operation, before shipment to a motor vehicle manufacturer.

The restraining strap 84 is preferably molded of plastic, such as nylon, and comprises an annular collar 86 provided with a pair of substantially parallel inwardly directed end flanges 88 and 90, FIG. 2, fitting over respectively a flange 92 formed on the end of the rim portion 56 of the carrier 48 and the end of the flange 72 of the dust cover 66. Alternatively, the restraining strap 84 and the dust cover 66 may be molded in a single piece, not shown. A pair of bands or strips 94, FIG. 1, are integrally molded with and extend from the strap annular collar 86, the free end of each band or strip 94 terminating, for example, with an integral strut, not shown, for example, or other means for attaching the end of each band or strip to the slave cylinder housing 20, at the housing flange 78. Each band or strip 94 of the restraining strap 84 is provided with a weakened portion, which may be a portion of reduced thickness, or a portion of reduced width, or both. After installation of the apparatus of the invention in a motor vehicle, and upon first actuation of the slave cylinder 18, hydraulic fluid displaced from the master cylinder 28 to the annular chamber 34 in the slave cylinder casing 20 causes displacement of the seal 46 and piston 40, and displacement of the throw-out bearing 60 as a result of the coupling between the piston 40 and the throw-out bearing through the carrier 48, with the result that the bands or strips 94 are broken at their weakened portion, thus releasing the throw-out bearing 60 for normal operation by the slave cylinder 18.

The structure of the housing 20 of the slave cylinder 18 of FIG. 3 is substantially alike the structure illustrated at FIG. 2, namely the slave cylinder housing 20 forms an integral assembly with the clutch bell housing 14. However, instead of being made of a single piece, as hereinbefore described, the slave cylinder housing 20 is made of two separate elements, one element forming the cylinder outer wall tubular member 38 being cast integral with the clutch bell housing 14, and the other element being in the form of a separate casting or molding 96, which may be made of a different material, and which comprises the cylinder wall inner tubular member, or quill, 36 having an annular flange 98 provided with an annular peripheral surface 100 of a diameter fitting within the cylinder outer wall tubular member 38, such as to define the bottom or closed end of the cylinder annular chamber 34. The casting or molding 96 has a mounting flange 102 for bolting, by means of appropriate bolts such as bolt 104, the casting or molding 96 to the tubular member 36 coaxially disposed within the outer wall cylinder tubular member 38. A seal, such as an O-ring 106, peripherally disposed around the cylindrical surface 100 of the flange 98 prevents leakage of fluid from the annular chamber 34 to the ambient, when fluid is introduced into the annular chamber 34 through the passageway 32 formed in a radial lug or extension 108 cast integral with the casting or molding 96.

It is readily apparent that the concentric annular cylinder 18 of FIG. 3, functions in the same manner as the concentric annular cylinder 18 of FIG. 2, after assembly of all the other elements, such as the annular piston, the throw-out bearing, the bearing carrier, etc., not illustrated at FIGS. 3-7.

The structure of FIG. 4 is alike the structure of FIG. 3, namely the slave cylinder outer wall tubular member 38 is made integral as a single piece with the clutch bell housing 14, and the tubular member 36, forming the cylinder inner tubular wall, is a separate bolted-on casting or molding 96. However, instead of being disposed in a radial lug or extension cast integral with the casting or molding 96, the fluid passageway 32 leading into the cylinder annular chamber 34 is disposed in the one-piece casting or molding formed by the bell housing 14 and integral cylinder outer wall tubular member 38.

In the structure of FIG. 5, the cylinder inner wall tubular member 36 is cast integral as a single piece with the clutch bell housing 14, while the cylinder inner wall tubular member 36 of the cylinder housing 20 is formed of a separate casting or molding 110 provided with a mounting flange 112 for bolting on the inner face of the bell housing 14 provided for that purpose with a mounting surface 114, appropriate bolts such as bolts 104 being used for that purpose. The fluid passageway 32 is disposed in a radial lug or extension 116 formed integral with the casting or molding 110. The bell housing 14 is provided with an appropriate aperture 118 for passage therethrough of the hose or line 26.

The structure of FIG. 6 provides an integral assembly of the concentric slave cylinder 18 on the face 17 of the casing or housing 15 of the transmission or gearbox 12. In the structure illustrated, the housing 20 of the concentric slave cylinder 18 is cast or molded in one piece and, in addition, the housing 20 is cast in one piece with the end cap or plate 24 closing the open end of the transmission or gearbox housing 15, through which the driveshaft 13 projects. The slave cylinder housing 20 is provided with a mounting flange 120 bolted to the end face 17 of the gearbox casing 15, by means of appropriate bolts, such as bolts 122, the clutch bell housing 14 being separately bolted, in a conventional manner, to the face 17 of the gearbox casing 15. The bell housing mounting face 16 is engaged with the face 17 of the gearbox casing 15 on the gearbox end flange 22 around the mounting flange 120 of the single piece assembly defined by the slave cylinder housing 20 integrally formed with the gearbox casing end plate 24.

The structure of FIG. 7 is identical to that of FIG. 6, except that the outer tubular member 38, forming the outer wall of the housing 20 of the slave cylinder 18, is made of a separate casting or molding 124 together with a radially disposed extension or lug 126 in which is bored the fluid passageway 32 leading into the annular chamber 34. The cylinder inner wall tubular member 36 is cast integral with the end plate 24 of the transmission or gearbox casing 15. The casting 124 is provided with a mounting flange 128 for bolting on an annular mounting face 130 formed on the common casting or molding of the cylinder inner wall tubular member 36 and transmission end plate 24 by means of bolts such as bolts 132. In the structure of FIG. 7, as in the structure of FIG. 6, the clutch bell housing 14 is provided with a slot 134 clearing the fluid line 26 and the fitting 33 during assembly of the bell housing 14 to the mounting face 17 of the gearbox or transmission casing 15, such that the slave cylinder 18 may be prefilled, together with the line 26 and the master cylinder, with fluid prior to installation of the apparatus in a motor vehicle on the motor vehicle manufacturer assembly line.

It will be appreciated by those skilled in the art that the present invention provides great flexibility in the assembly of motor vehicles provided with a mechanical clutch and a hydraulic clutch release mechanism having a slave cylinder disposed concentric to the driveshaft, by making the slave cylinder integral with the clutch bell housing 14, FIGS. 1-5, or integral with the end plate 24 of the transmission or gearbox casing 15, FIG. 6-7. It will also be appreciated that although the master cylinder 28, FIG. 1, may be installed on the motor vehicle separately from the slave cylinder 18 and connected to the slave cylinder 18 by way of the line 26, the apparatus being filled and bled at some station on the assembly line in a conventional manner, preferably the hydraulic clutch release apparatus is supplied to the motor vehicle manufacturer as a complete unit in assembly with the clutch bell housing or, alternatively, in assembly with the gearbox, the master cylinder 28 being connected to the slave cylinder 18 through the line 26 and the apparatus having been pretested and prefilled prior to assembly on the motor vehicle. In structures wherein the slave cylinder 18 forms an integral assembly with the clutch bell housing 14, the master cylinder 28 is momentarily attached by appropriate straps, for example, to lugs or to mounting holes of the bell housing 14, until the bell housing is mounted on the engine, at which time the master cylinder is detached from the bell housing and installed in the floorboard or bulkhead of the vehicle body, and the input rod 28 of the master cylinder 30 is connected to the clutch release pedal 31. In structures, FIGS. 6-7, wherein the slave cylinder 18 is part of the gearbox assembly, the master cylinder 28 may be attached with appropriate straps to the slave cylinder itself or to any appropriate portion of the gearbox casing 15, until the gearbox is installed on the motor vehicle frame and until the master cylinder is installed at its appropriate location in the floorboard or bulkhead.

It will also be appreciated that any appropriate material may be used for the slave cylinder 18, such as cast iron or preferably a light metal alloy such as an aluminum alloy. In structures wherein the outer member 38 and the inner member 36 are separate units, different metals or metal alloys may be used, or metal used for one unit and plastic for the other.

Having thus described the present invention by way of structural embodiment thereof, modifications thereof will be apparent to those skilled in the art, what is claimed as new is as follows:

1. In a motor vehicle drive train of the type comprising a friction clutch having at least one spring biased release element, a structural housing in the form of a casting at least partially radially surrounding the clutch and, concentric with said housing, a driveshaft connecting the output of the clutch to the input of a gearbox; an hydraulic clutch actuator in the form of a slave cylinder comprising radially spaced inner and outer tubular elements together defining a chamber which is open in the direction of the clutch release element and substantially closed at the opposite end, a piston element slidably disposed between and in contact with both of said inner and outer tubular elements, a bearing retainer element in abutting contact with said piston to be axially driven therewith, a rotary throw-out bearing held by said retainer element and contacting said release element to operate same when said piston is displaced within said chamber, said chamber, said piston, said retainer means and said bearing all being concentric with said shaft and mounted around said shaft, the housing and at least the outer tubular element of said cylinder being cast as an integral unitary element, said inner tubular member formed of a separate element having a flange for attaching to said outer tubular member, said flange being formed with a hydraulic fluid passage therethrough for supplying fluid to said chamber to actuate said piston.

* * * * *